(12) United States Patent
Nakamura

(10) Patent No.: US 10,838,889 B2
(45) Date of Patent: Nov. 17, 2020

(54) I/O EXPANSION DEVICE, CONTROL SYSTEM, AND AUTOMOTIVE SYSTEM

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yoshihito Nakamura, Sagamihara Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 153 days.

(21) Appl. No.: 16/116,789

(22) Filed: Aug. 29, 2018

(65) Prior Publication Data

US 2019/0278723 A1 Sep. 12, 2019

(30) Foreign Application Priority Data

Mar. 9, 2018 (JP) .................. 2018-042662

(51) Int. Cl.
  *G06F 13/20* (2006.01)
  *G06F 13/42* (2006.01)
(52) U.S. Cl.
  CPC .......... *G06F 13/20* (2013.01); *G06F 13/4282* (2013.01); *G06F 2213/0008* (2013.01)

(58) Field of Classification Search
  CPC .................. G06F 13/20; G06F 13/4282; G06F 2213/0008
  See application file for complete search history.

(56) References Cited

U.S. PATENT DOCUMENTS

2008/0219477 A1* 9/2008 Aiso ...................... H04B 1/205
  381/119
2012/0246510 A1* 9/2012 Kojina ................ G06F 13/4282
  714/4.5

FOREIGN PATENT DOCUMENTS

JP H07-104851 B2 11/1995
JP H10-143462 A 5/1998
JP 2010-271768 A 12/2010

* cited by examiner

*Primary Examiner* — Nimesh G Patel
(74) *Attorney, Agent, or Firm* — Kim & Stewart LLP

(57) ABSTRACT

According to one embodiment, an I/O expansion device configured to communicate with a master circuit and an electrical component includes a port circuit configured to transmit an output signal to the electrical component based on a first input signal from the master circuit, a memory that stores first setting data set by the first input signal from the master circuit, a comparison circuit configured to compare second setting data set by a second input signal from the master circuit with the first setting data stored in the memory and transmit an abnormality signal to the master circuit when the second setting data is not identical with the first setting data.

18 Claims, 5 Drawing Sheets

I/O EXPANSION DEVICE, CONTROL SYSTEM, AND AUTOMOTIVE SYSTEM

CROSS-REFERENCE TO RELATED APPLICATION

This application is based upon and claims the benefit of priority from Japanese Patent Application No. 2018-042662 filed Mar. 9, 2018, the entire contents of which are incorporated herein by reference.

FIELD

Embodiments described herein relate generally to an input/output (I/O) expansion device, a control system, and an automotive system.

BACKGROUND

Recently, there has been developed a technology for uniformly controlling electrical car components connected through an in-vehicle local area network (LAN). In a conventional technique, an I/O expansion device is disposed between the master circuit and the respective electrical components to control flows of signals. For the I/O expansion device, both high reliability and low costs are desired.

DETAILED DESCRIPTION

An embodiment provides an I/O expansion device and a control system which are high in reliability and low in cost.

In general, according to one embodiment, an I/O expansion device is configured to communicate with a master circuit and an electrical component. The I/O expansion device comprises a port circuit configured to transmit an output signal to the electrical component based on a first input signal from the master circuit, a memory that stores first setting data set by the first input signal from the master circuit, and a comparison circuit configured to compare second setting data set by a second input signal from the master circuit with the first setting data stored in the memory, and transmit an abnormality signal to the master circuit when the second setting data is not identical with the first setting data.

A control system, according to an embodiment, comprises a master circuit and an I/O expansion device. The I/O expansion device comprises a port circuit configured to transmit an output signal to an electrical component based on a first input signal from the master circuit, a memory that stores first setting data set by the first input signal from the master circuit, and a comparison circuit configured to compare second setting data set by a second input signal from the master circuit with the first setting data stored in the memory; and transmit an abnormality signal to the master circuit when the second setting data is not identical with the first setting data.

An automotive system according to an embodiment comprises a master circuit, one or more electrical car components, and an I/O expansion device configured to communicate with the master circuit and the electrical car component. The I/O expansion device comprises a port circuit configured to transmit an output signal to one of the electrical car components based on a first input signal from the master circuit, a memory that stores first setting data set by the first input signal from the master circuit, and a comparison circuit configured to compare second setting data set by a second input signal from the master circuit with the first setting data stored in the memory, and transmit an abnormality signal to the master circuit when the second setting data is not identical with the first setting data.

First Embodiment

First, a first embodiment will be described.

Figure 1:
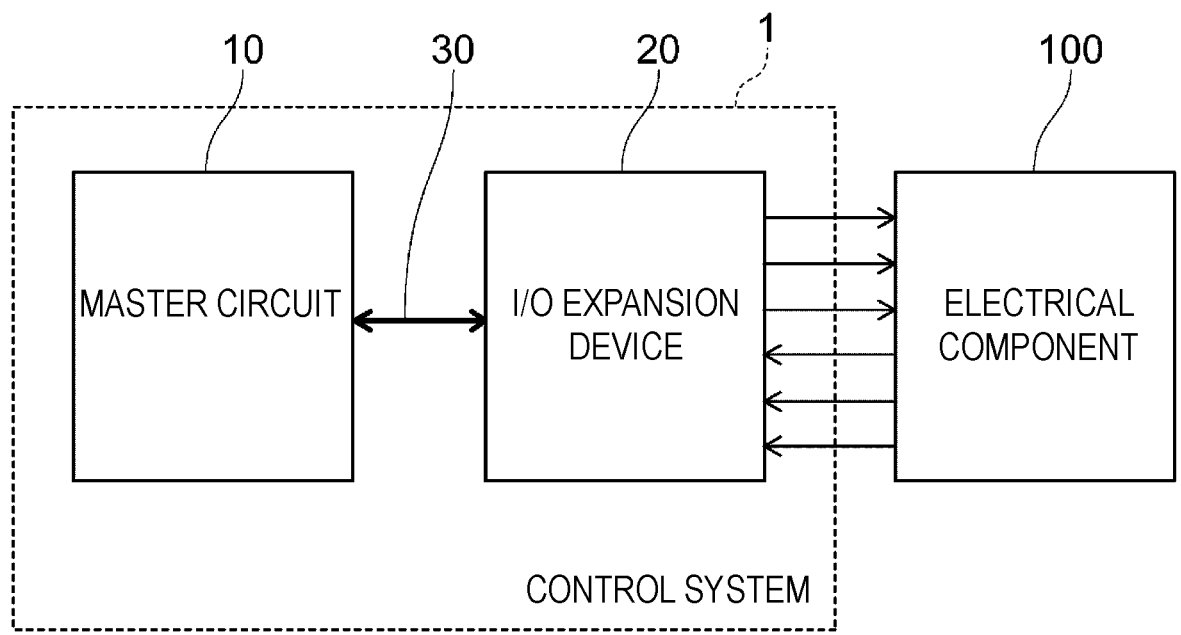
FIG. 1 is a block diagram illustrating a control system according to a first embodiment.

FIG. 1 is a block diagram illustrating a control system according to the present embodiment.

Figure 2:
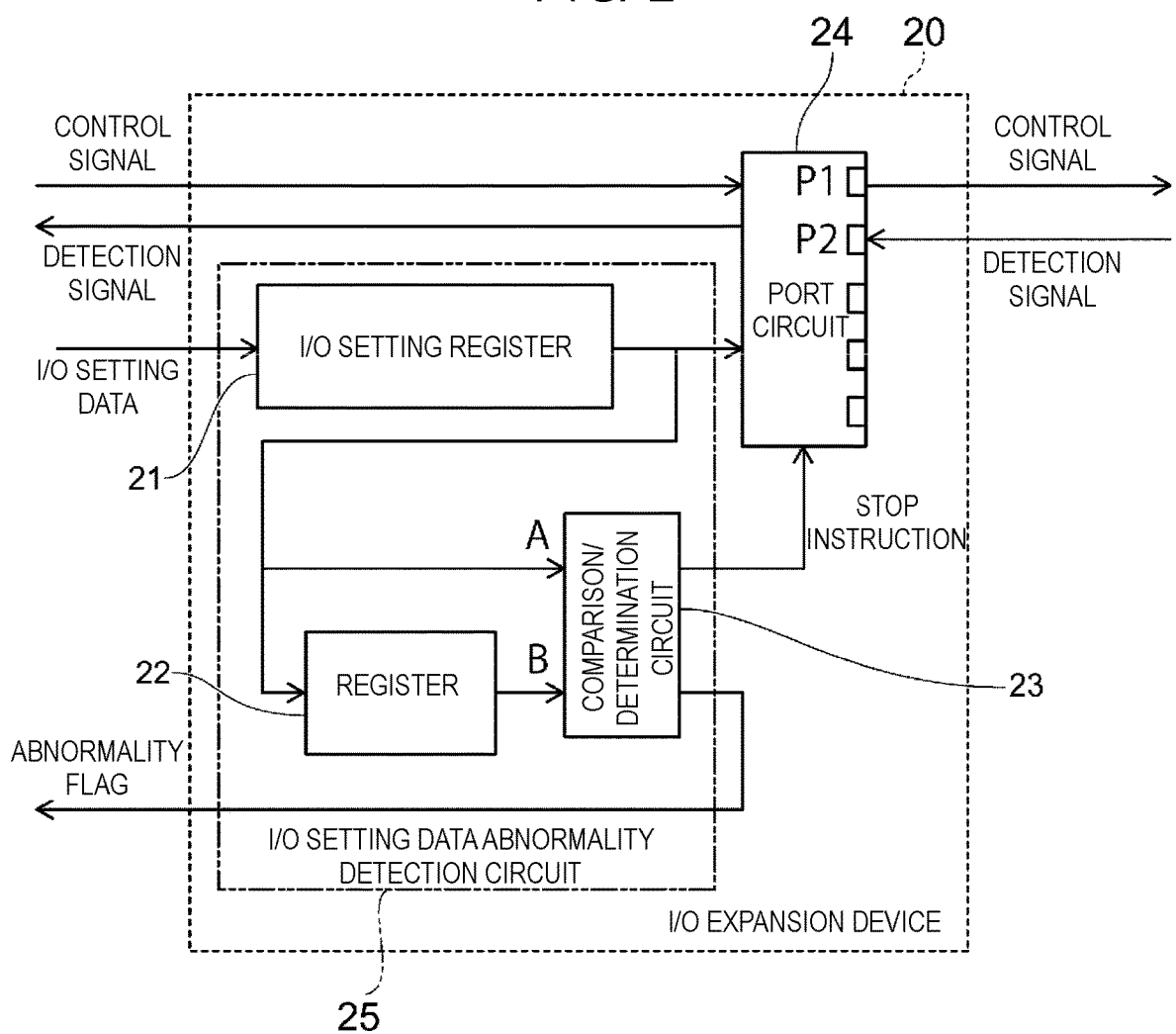
FIG. 2 is a block diagram illustrating an I/O expansion device according to the first embodiment.

FIG. 2 is a block diagram illustrating an I/O expansion device according to the present embodiment.

As illustrated in FIG. 1, a control system 1 according to the present embodiment is a control system which is mounted in, for example, an automobile and uniformly controls multiple electrical components 100 of the automobile. Further, the "electrical component" in the present specification is a generic term for a component that operates by electric power.

A master circuit 10 and an I/O expansion device 20 are provided in the control system 1. The master circuit 10 and the I/O expansion device 20 are connected through a bus 30. Typically, the master circuit 10 is a microcomputer for central control, and only one master circuit 10 is provided in the automobile. Further, the master circuit 10 may be a microcomputer for local control which is provided in the vicinity of the electrical component 100, and may be, for example, a micro control unit (MCU). The bus 30 is, for example, a serial bus (e.g., a serial peripheral interface (SPI)). Meanwhile, the I/O expansion device 20 is provided for each of the electrical components 100, so that multiple I/O expansion devices 20 are provided in the automobile.

The I/O expansion device 20 is provided with multiple ports usable for both an input and an output. These ports are allocated to various types of inputs and various types of outputs by I/O setting data input from the master circuit 10. Typically, the allocation of the ports of the I/O expansion device 20 is fixed because the allocation is determined by a connection relationship with the electrical components 100. At the time of starting the control system 1, regularly during the operation, and when an abnormality flag to be described below is detected, the master circuit 10 generates I/O setting data and outputs the I/O setting data to the I/O expansion device 20.

As illustrated in FIG. 2, the I/O expansion device 20 is provided with a port circuit 24 and an I/O setting data abnormality detection circuit 25. The I/O setting data abnormality detection circuit 25 is provided with an I/O setting register 21, a register 22, and a comparison/determination circuit 23.

The I/O setting data output from the master circuit 10 is input to the I/O setting register 21 through the bus 30, and the I/O setting register 21 holds the I/O setting data. In addition, the I/O setting register 21 outputs the I/O setting data to the register 22, which in some embodiments, may be a non-volatile memory such as a static random access memory (SRAM) or a dynamic random access memory (DRAM), the comparison/determination circuit 23, and the port circuit 24.

The register 22 holds the I/O setting data, as holding data, which are input from the I/O setting register 21, and the register 22 outputs the held I/O setting data (holding data) to the comparison/determination circuit 23. There is a time difference between the timing at which certain I/O setting data are input to the register 22 and the timing at which the I/O setting data are output from the register 22. For this reason, the register 22 outputs the I/O setting data input at the immediately preceding timing.

The comparison/determination circuit 23 compares I/O setting data A input from the I/O setting register 21 with I/O setting data B (holding data) input from the register 22, and determines whether the I/O setting data A and the I/O setting data B are identical to or different from each other. When the I/O setting data A and the I/O setting data B are different from each other, the comparison/determination circuit 23 outputs a stop instruction to the port circuit 24 and outputs an abnormality flag to the master circuit 10. Meanwhile, when the I/O setting data A and the I/O setting data B become identical to each other, the stop instruction is cancelled.

The port circuit 24 is provided with multiple ports. The respective ports may be used to input and output signals, and the use of each of the ports is allocated based on the I/O setting data. The port circuit 24 inputs and outputs various types of signals through the bus 30 between the port circuit 24 and the master circuit 10, and inputs and outputs various types of signals through the ports between the port circuit 24 and the electrical components 100. For example, the port circuit 24 outputs a control signal for controlling the electrical component 100 from the port P1, and a detection signal is input to the port P2 from the electrical component 100 and is relayed to the master circuit 10. The port circuit 24 stops inputting and outputting the signals with respect to the electrical component 100 when the stop instruction is input from the comparison/determination circuit 23, and the port circuit 24 restarts inputting and outputting the signals with respect to the electrical component 100 when the stop instruction is cancelled.

Next, an operation of the I/O expansion device 20 according to the present embodiment will be described.

Figure 3:
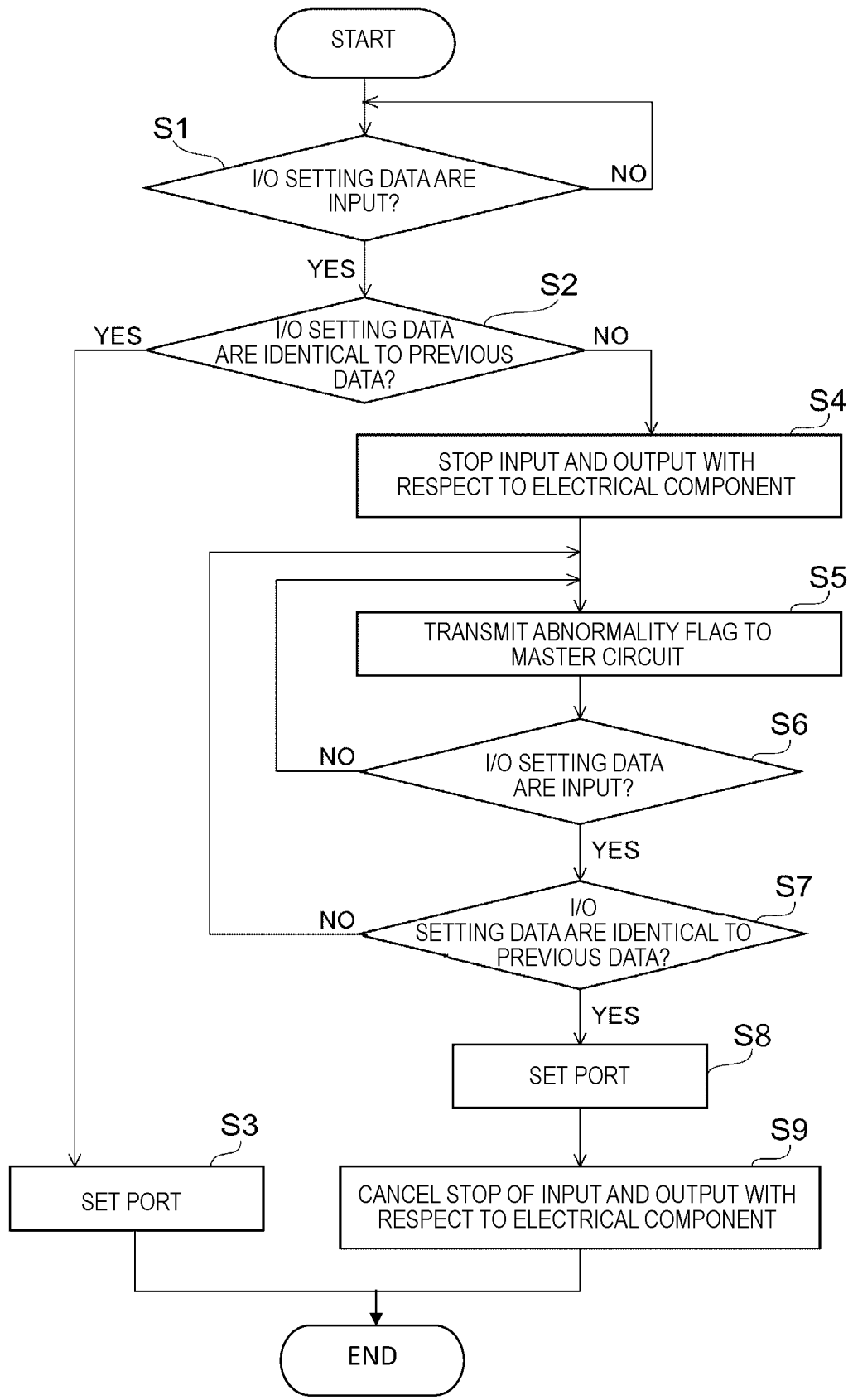
FIG. 3 is a flowchart illustrating an operation of the I/O expansion device according to the first embodiment.

FIG. 3 is a flowchart illustrating an operation of the I/O expansion device according to the present embodiment.

Hereinafter, the operation of the I/O expansion device 20 will be described with reference to FIGS. 1 to 3.

First, an operation at the time of starting the control system 1 will be described.

When the control system 1 is started, the I/O expansion device 20 is in a state capable of receiving the I/O setting data, as indicated in step S1 in FIG. 3. Meanwhile, the master circuit 10 generates the I/O setting data and outputs the I/O setting data to the I/O setting register 21 of the I/O expansion device 20 through the bus 30. The I/O setting register 21 outputs the input I/O setting data to the register 22, the comparison/determination circuit 23, and the port circuit 24 while holding the input I/O setting data. The register 22 holds the input I/O setting data.

Next, as indicated in step S2, the comparison/determination circuit 23 compares the I/O setting data A input from the I/O setting register 21 with the I/O setting data B input from the register 22. The I/O setting data B is the data which are input to the I/O expansion device 20 before the I/O setting data A are input. Because the allocation of the ports of the I/O expansion device 20 is determined by the configuration of the electrical component 100, the I/O setting data are fixed basically. For this reason, the I/O setting data A and the I/O setting data B are identical to each other.

Therefore, the process goes to step S3 from step S2, the allocation of the ports is set based on the I/O setting data, and the process goes back to step S1. Thereafter, the signals are exchanged between the master circuit 10 and the electrical component 100 through the port circuit 24, and then the operation of the electrical component 100 is controlled.

Next, an operation when abnormality data are input to the I/O expansion device 20 will be described.

The abnormality data include, for example, an abnormality which is caused in the I/O setting data output from the master circuit 10 because noise is superposed in the bus 30, and an abnormality which is caused by an erroneous operation of the master circuit 10 itself. In addition, in some instances, by the noise or the like, the I/O setting register 21 is initialized, and the I/O setting data are lost. For example, the noise is caused by a variation in voltage of a power source.

In order to detect whether an error occurs in the I/O setting data on a communication path when transmitting the I/O setting data to the I/O expansion device 20 from the master circuit 10, an error detection such as a cyclic redundancy check (CRC), for example, a parity bit check is performed on the I/O setting data, and the I/O setting data is transmitted after an error correction code (ECC) is attached to the I/O setting data. However, when the abnormality occurs in the master circuit 10 itself, the master circuit 10 generates an erroneous I/O setting data and the ECC based on the erroneous I/O setting data, and as a result, the I/O expansion device 20 cannot detect the error based on the ECC.

As indicated in step S1 in FIG. 3, when the I/O setting data are input to the I/O expansion device 20, the process goes to step S2, and the comparison/determination circuit 23 compares the I/O setting data A held in the I/O setting register 21 with the I/O setting data B held in the register 22. Here, if the register 22 stores previously input normal data B while abnormality data are input from the master circuit 10, the I/O setting data A in the I/O setting register 21 and the I/O setting data B stored in the register 22 are different. Alternatively, if the I/O setting data are unexpectedly initialized, the initialized I/O setting data A are different from the I/O setting data B which are previously input.

In these cases, the process goes to step S4 from step S2, and the comparison/determination circuit 23 outputs the stop instruction to the port circuit 24. As a result, the port circuit 24 stops inputting and outputting the signals with respect to the electrical component 100.

Next, as indicated in step S5, the comparison/determination circuit 23 outputs the abnormality flag to the master circuit 10. When the abnormality flag is detected, the master circuit 10 generates the I/O setting data again and outputs the I/O setting data to the I/O expansion device 20.

Next, as indicated in step S6, when new I/O setting data are input to the I/O expansion device 20 from the master circuit 10, the comparison/determination circuit 23 compares the newly input I/O setting data A with the I/O setting data B which are previously input and held by the register 22, as indicated in step S7.

When the I/O setting data A are different from the I/O setting data B, the process goes back to step S5, and the abnormality flag is output to the master circuit 10 again. Meanwhile, when the I/O setting data A are identical to the I/O setting data B, the process goes to step S8, and the ports are reset based on the I/O setting data A. Next, the stop instruction is cancelled as indicated in step S9. Therefore, the port circuit 24 restarts inputting and outputting the signals with respect to the electrical component 100.

The master circuit 10 outputs the I/O setting data to the I/O expansion device 20 not only when starting the control system 1 but also regularly even after starting the control system 1.

Next, an effect of the present embodiment will be described.

As described above, the I/O expansion device 20 according to the present embodiment outputs the abnormality flag to the master circuit 10 when the I/O setting data, which are different from the previously input I/O setting data, are input, or, when the I/O setting register 21 is initialized. Further, when the abnormality flag is detected, the master circuit 10 transmits the I/O setting data to the I/O expansion device 20 again. Therefore, the I/O expansion device 20 may reset the ports based on accurate I/O setting data. In this way, when the abnormality data are input to the I/O expansion device 20 and even when the initialization is erroneously performed, the setting of the ports is quickly restored, and as a result, it is possible to prevent an erroneous operation of the electrical component 100. Therefore, the I/O expansion device 20 and the control system 1 according to the present embodiment have high reliability.

The I/O expansion device 20 outputs the stop instruction to the port circuit 24 when the abnormality data are input and when the initialization is erroneously performed. Therefore, the port circuit 24 stops inputting and outputting the signals between the port circuit 24 and the electrical component 100 until the ports are reset based on the accurate I/O setting data. As a result, it is possible to more assuredly prevent an erroneous operation of the electrical component 100.

The master circuit 10 regularly generates the I/O setting data and outputs the I/O setting data to the I/O expansion device 20 even after the control system 1 is started, and as a result, it is possible to perform a series of operations on the I/O expansion device 20 as illustrated in FIG. 3, and it is possible to check whether the accurate I/O setting data are held in the I/O setting register 21. Therefore, even in a case in which an abnormality occurs in the I/O setting data held in the I/O setting register 21 during the operation of the control system 1, it is possible to reduce the time until the abnormality is detected after the abnormality occurs. As a result, reliability of the I/O expansion device 20 and the control system 1 is further improved.

The roles of the ports of the I/O expansion device 20 are set based on the I/O setting data input from the master circuit 10. Therefore, the general-purpose I/O expansion device 20 may be individually set and used in conformity with the electrical component 100. As a result, one type of I/O expansion device 20 may be used for multiple types of electrical components 100, and costs for the I/O expansion devices 20 may be reduced.

It is also conceivable that a device in which the role of the port is fixed in a hardware manner is used as the I/O expansion device. However, in this case, it is necessary to manufacture the dedicated I/O expansion device in conformity with the electrical component 100, and as a result, costs for the I/O expansion device are increased. In addition, it is conceivable that a nonvolatile memory for starting the I/O expansion device is provided in the I/O expansion device, the I/O setting data is stored in the nonvolatile memory, and the ports are set by reading out the I/O setting data from the nonvolatile memory when starting the I/O expansion device. However, in this case, costs for the I/O expansion device are increased because it is necessary to provide the nonvolatile memory in the I/O expansion device. In contrast, in the present embodiment, the allocation of the ports of the general-purpose I/O expansion device 20 may be individually set by the master circuit 10. For this reason, one type of I/O expansion device 20 may be used for multiple types of electrical components 100, and costs for the I/O expansion devices 20 may be reduced.

Second Embodiment

Next, a second embodiment will be described.

The present embodiment is a specific example in which the aforementioned control system according to the first embodiment is applied to a vehicle-mounted system.

Figure 4:
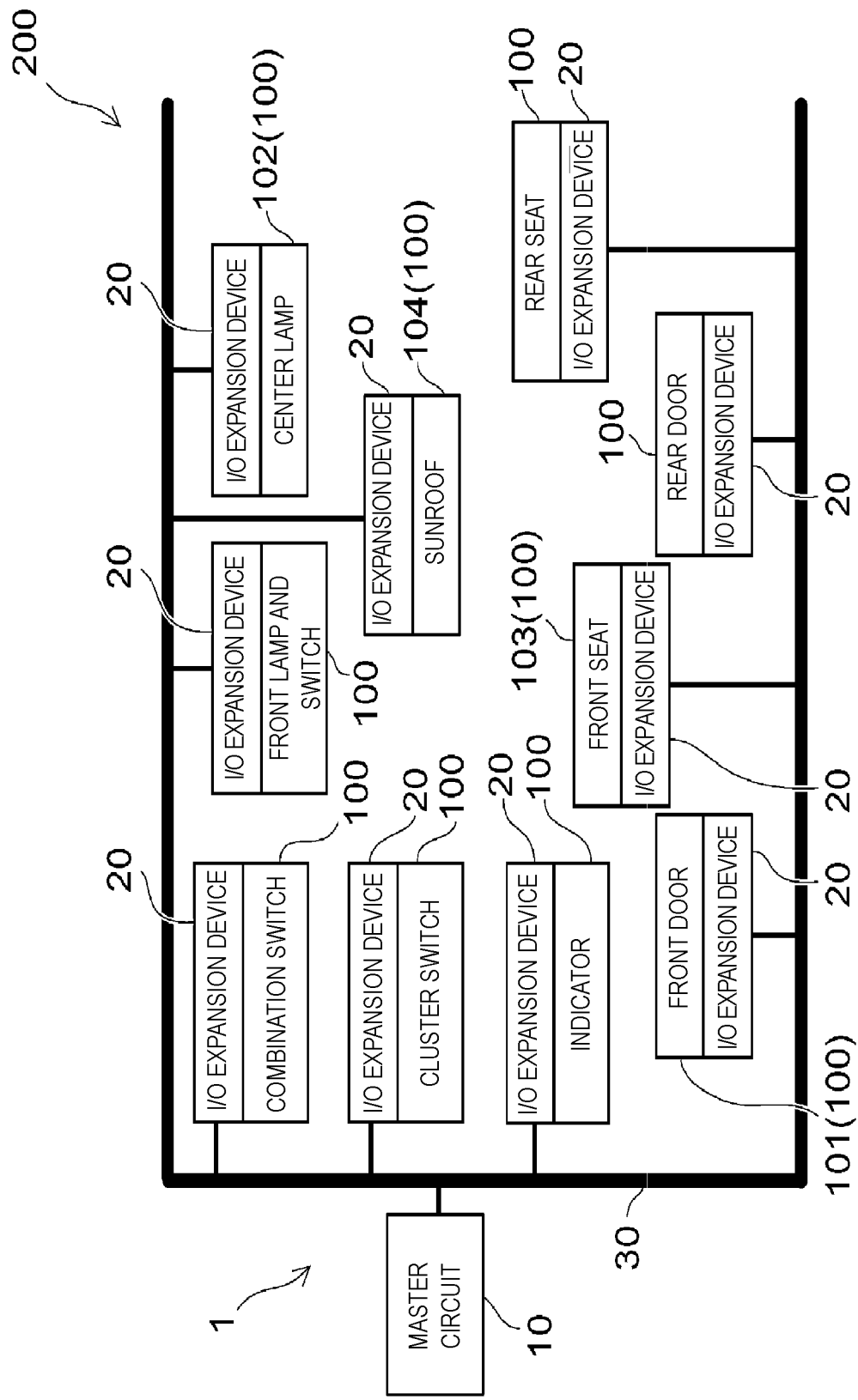
FIG. 4 is a block diagram illustrating a control system according to a second embodiment.

FIG. 4 is a block diagram illustrating a control system according to the present embodiment.

Figure 5:
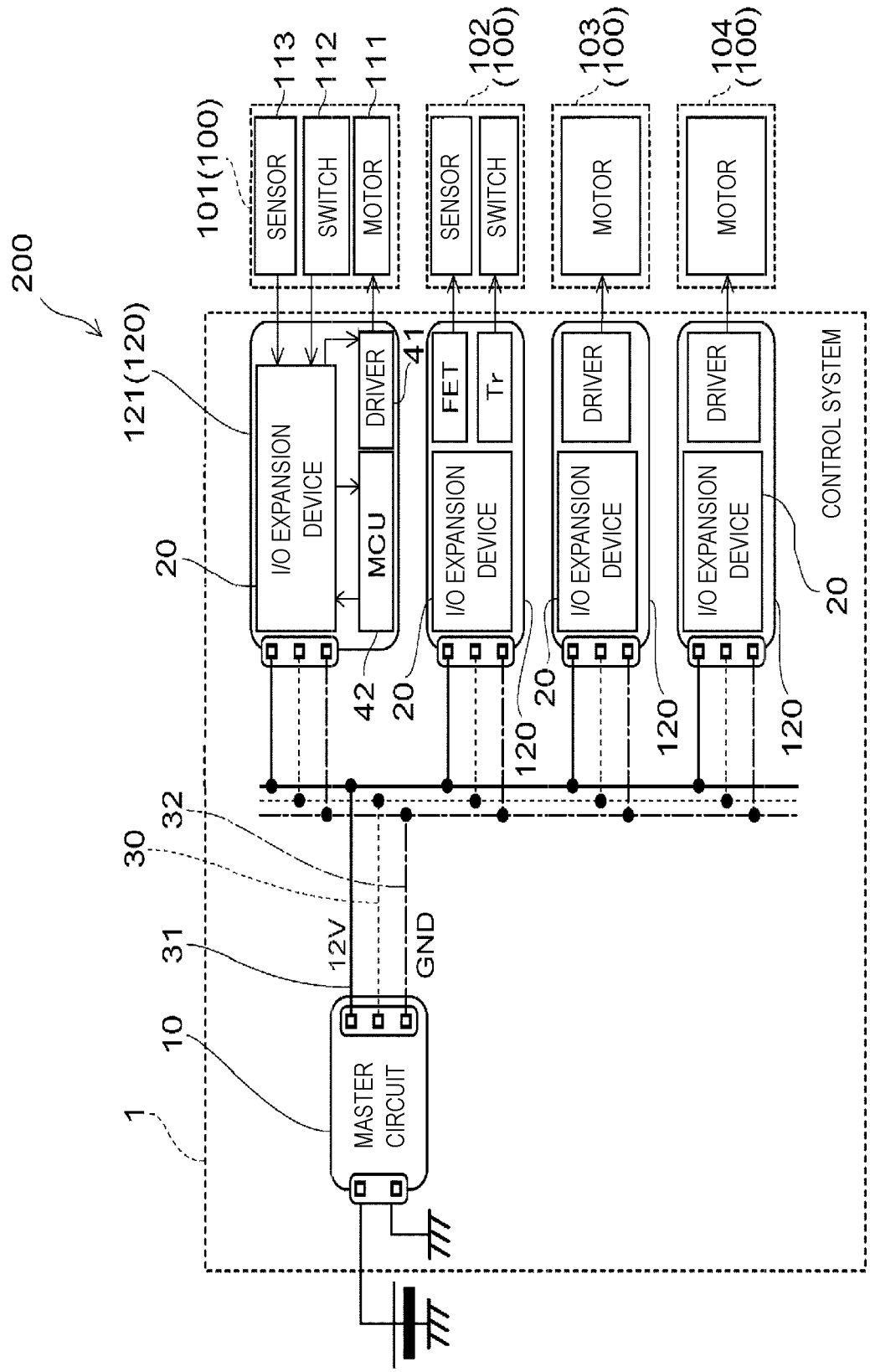
FIG. 5 is a block diagram illustrating a part of the control system illustrated in FIG. 4.

FIG. 5 is a block diagram illustrating a part of the control system illustrated in FIG. 4.

As illustrated in FIG. 4, a vehicle-mounted system 200 of an automobile is provided with a single control system 1, and multiple electrical components 100 connected to the control system 1. The electrical components 100 include, for example, a front door 101, a center lamp 102, a front sheet 103, a sunroof 104, and the like.

The control system 1 is provided with a single master circuit 10 and multiple I/O expansion devices 20. The configuration of the I/O expansion device 20 is identical to that described in the first embodiment. The master circuit 10 and the I/O expansion devices 20 are connected through a bus 30. The respective I/O expansion devices 20 exchange signals between the respective I/O expansion devices 20 and the respective electrical components 100.

As illustrated in FIG. 5, for example, a power line 31 for supplying power electric potential of 12 V (volt) and a ground line 32 for supplying ground potential (GND) are connected between the master circuit 10 and the I/O expansion device 20 in addition to the bus 30 for transmitting the signals. Further, the ground 32 is embodied by a vehicle body of the automobile.

As necessary, a calculation unit such as an MCU, a driver for operating a motor, an electric field effect transistor (FET) and a bipolar transistor (Tr) as switching elements, and the like are provided around the I/O expansion device 20 and constitute a single component 120 together with the I/O expansion device 20.

Hereinafter, the front door 101 at a side of a front passenger seat will be described as an example of the electrical component 100.

As illustrated in FIG. 5, the front door 101 at the side of the front passenger seat is provided with a motor 111 which moves a window glass (not illustrated) upward and downward, a switch 112 which operates the upward and downward movements of the window glass from the front passenger seat, and a sensor 113 which detects a foreign object caught between the window glass and the vehicle body.

The switch 112 outputs a detection signal to the port of the I/O expansion device 20. The sensor 113 also outputs the detection signal to the port of the I/O expansion device 20. In addition, the window glass of the front door 101 at the side of the front passenger seat may be moved upward and downward by an operation of a switch (not illustrated) at a side of a driver seat. In this case, a control signal for controlling the motor 111 is input to the I/O expansion device 20 from the master circuit 10 through the bus 30.

A component 121, which corresponds to the front door 101 at the side of the front passenger seat, is provided with the I/O expansion device 20, a driver 41, and an MCU 42. The control signal output from the port of the I/O expansion device 20 is input to the driver 41, and the driver 41 supplies driving power to the motor 111. The MCU 42 is a calculation unit that determines an operation of the motor 111 based on the control signal input from the master circuit 10, the control signal input from the switch 112, and the detection signal input from the sensor 113, and exchanges the signals between the MCU 42 and the I/O expansion device 20. For example, the MCU 42 operates the motor 111 when the switch at the side of the driver seat or the switch 112 at the side of the front passenger seat is operated, but when the sensor 113 detects a foreign object, the MCU 42 stops the motor 111 regardless of a state of the switch.

The control system 1 is provided with the I/O expansion devices 20 corresponding to the respective electrical components 100 such as the center lamp 102, the front sheet 103, and the sunroof 104. These I/O expansion devices 20 have the same configuration, but the roles of the ports are individually set in accordance with types of electrical components 100 to be controlled. As described in the first embodiment, the roles of the ports of the respective I/O expansion devices 20 are set by the master circuit 10.

Next, an effect of the present embodiment will be described.

The control system 1, which constitutes the vehicle-mounted system 200, is provided with the multiple I/O expansion devices 20 corresponding to the multiple electrical components 100, but the I/O expansion devices 20 having the same configuration may be used. Therefore, it is possible to reduce costs for the I/O expansion devices 20. In addition, as described in the first embodiment, even when the abnormality data are input to the I/O expansion device 20 or the held I/O setting data are initialized, the abnormality may be detected by comparing the I/O setting data with the previously input I/O setting data such that the roles of the ports may be reset. For this reason, the control system 1 has high reliability. The configurations, operations, and effects in the present embodiment except for the described configurations, operations, and effects are identical to those described in the first embodiment.

The specific examples in which the control system is applied to the vehicle-mounted system have been described in the first and second embodiments, but an object to which the control system of the present disclosure is applied is not limited to the vehicle-mounted system, and the control system is suitably applicable as long as the control system serves to uniformly control the multiple electrical components. For example, the control system may be applied to a maintenance system for a building.

According to the aforementioned embodiments, it is possible to implement the I/O expansion device and the control system which have high reliability and require low costs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An I/O expansion device configured to communicate with a master circuit and an electrical component, the I/O expansion device comprising:
   a port circuit configured to transmit an output signal to the electrical component based on a first input signal from the master circuit;
   a memory that stores first setting data set by the first input signal from the master circuit; and
   a comparison circuit configured to:
     compare second setting data set by a second input signal from the master circuit with the first setting data stored in the memory, and
     when the second setting data is not identical with the first setting data, transmit an abnormality signal to the master circuit, and instruct the port circuit to stop transmitting any output signal to the electrical component.

2. The I/O expansion device according to claim 1, wherein the comparison circuit is configured to:
   compare third setting data set by a third input signal from the master circuit with the first setting data, and
   instruct the port circuit to start transmitting an output signal to the electrical component when the third setting data is identical with the first setting data.

3. The I/O expansion device according to claim 1, wherein the port circuit is configured to receive an input signal from the electrical component and relay the input signal to the master circuit, and
   the comparison circuit instructs the port circuit to stop relaying the input signal from the electrical component when the second setting data is not identical with the first setting data.

4. The I/O expansion device according to claim 3, wherein the comparison circuit is configured to:
   compare third setting data set by a third input signal from the master circuit with the first setting data, and
   instruct the port circuit to start relaying the input signal to the master circuit when the third setting data is identical with the first setting data.

5. The I/O expansion device according to claim 1, wherein the memory is a non-volatile memory.

6. The I/O expansion device according to claim 1, further comprising:
   an I/O setting register that stores the first and the second setting data received from the master circuit.

7. The I/O expansion device according to claim 1, wherein the first input signal is input from the master circuit when a system controlled by the master circuit starts.

8. The I/O expansion device according to claim 1, wherein the master circuit is a micro control unit (MCU).

9. The I/O expansion device according to claim 1, wherein the I/O expansion device and the master circuit are connected to each other by a serial bus.

10. A control system comprising:
    a master circuit; and
    an I/O expansion device comprising:
      a port circuit configured to transmit an output signal to an electrical component based on a first input signal from the master circuit;
      a memory that stores first setting data set by the first input signal from the master circuit; and
      a comparison circuit configured to:
        compare second setting data set by a second input signal from the master circuit with the first setting data stored in the memory; and
        when the second setting data is not identical with the first setting data, transmit an abnormality signal to the master circuit, and instruct the port circuit to stop transmitting any output signal to the electrical component.

11. The control system according to claim 10, wherein the comparison circuit is configured to:
compare third setting data set by a third input signal from the master circuit with the first setting data, and
instruct the port circuit to start transmitting an output signal to the electrical component when the third setting data is identical with the first setting data.

12. The control system according to claim 10, wherein
the port circuit is configured to receive an input signal from the electrical component and relay the input signal to the master circuit, and
the comparison circuit instructs the port circuit to stop relaying the input signal from the electrical component when the second setting data is not identical with the first setting data.

13. The control system according to claim 12, wherein the comparison circuit is configured to:
compare third setting data set by a third input signal from the master circuit with the first setting data, and
instruct the port circuit to start relaying the input signal to the master circuit when the third setting data is identical with the first setting data.

14. The control system according to claim 10, wherein the memory is a non-volatile memory.

15. The control system according to claim 10, further comprising:
an I/O setting register that stores the first and the second setting data received from the master circuit.

16. An automotive system comprising:
a master circuit;
one or more electrical car components; and
an I/O expansion device configured to communicate with the master circuit and the electrical car components, the I/O expansion device comprising:
a port circuit configured to transmit an output signal to one of the electrical car components based on a first input signal from the master circuit;
a memory that stores first setting data set by the first input signal from the master circuit; and
a comparison circuit configured to:
compare second setting data set by a second input signal from the master circuit with the first setting data stored in the memory; and
when the second setting data is not identical with the first setting data, transmit an abnormality signal to the master circuit, and instruct the port circuit to stop transmitting any output signal to the electrical component.

17. The automotive system according to claim 16, wherein the master circuit and the I/O expansion device are connected to each other by a bus, a power line, and a ground line.

18. The automotive system according to claim 16, further comprising:
an MCU configured to communicate with the I/O expansion device, wherein
the electrical car components include a sensor and a switch, and
the MCU disables the switch when the I/O expansion device detects an abnormal input from the sensor.

* * * * *